United States Patent
Blaszczak et al.

[19]

[11] Patent Number: 6,135,530
[45] Date of Patent: Oct. 24, 2000

[54] SPRING LOADED LIVING HINGE

[75] Inventors: Alan Blaszczak, Farmington Hills; Gary Nardini, Clinton Township, both of Mich.

[73] Assignee: Lear Automotive Dearborn, Inc., Southfield, Mich.

[21] Appl. No.: 09/185,691

[22] Filed: Nov. 4, 1998

[51] Int. Cl.$^7$ ........................................................ B60R 7/04
[52] U.S. Cl. ........................ 296/37.8; 296/37.12; 16/286; 16/304
[58] Field of Search .............................. 296/37.12–37.14, 296/153, 37.7, 37.8; 16/225, 227, 286, 304, 306; 220/837–839; 224/282

[56] References Cited

U.S. PATENT DOCUMENTS

| | | | |
|---|---|---|---|
| 2,235,984 | 3/1941 | Devereaux | 16/306 X |
| 3,477,091 | 11/1969 | Gordon | 16/227 |
| 3,713,578 | 1/1973 | Johnson | 16/225 X |
| 4,363,191 | 12/1982 | Morgan | 16/225 X |

FOREIGN PATENT DOCUMENTS

| | | | |
|---|---|---|---|
| 2380913 | 10/1978 | France | 296/37.13 |
| 672525 | 11/1989 | Switzerland | 16/225 |
| 2247654 | 3/1992 | United Kingdom | 296/37.12 |

*Primary Examiner*—Dennis H. Pedder
*Attorney, Agent, or Firm*—MacMillan, Sobanski & Todd, LLC

[57] ABSTRACT

A trim component for a vehicle incorporates a spring-loaded living hinge for connecting a door. Preferably, the door includes a rigid panel having a first portion and a second portion joined by a flexible region comprising a living hinge. A spring biases the first portion away from the second portion. Preferably, a pivot point is located adjacent the flexible region and helps to secure the spring to the first and second portions. The door is secured to the trim component by a latch that holds the first portion relative to the second portion. Release of the latch permits the spring to rotate the first portion away from the second portion. Thus, a door incorporating the present design is capable of rotating the first portion relative to the second portion in an unassisted fashion in opposition to the force of gravity.

20 Claims, 4 Drawing Sheets

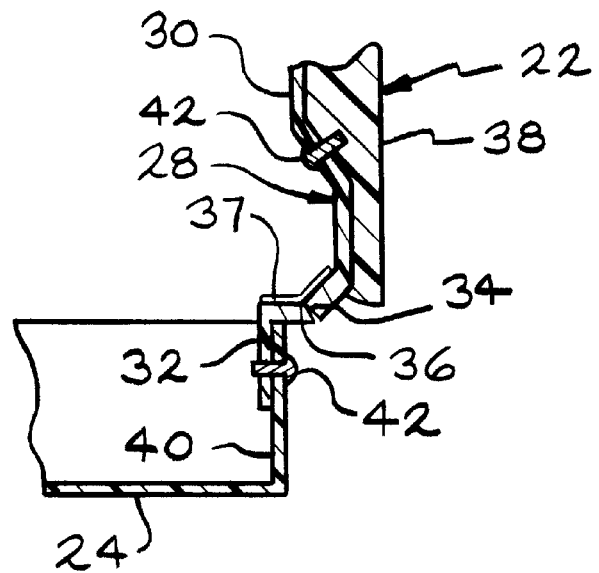
FIG. 3
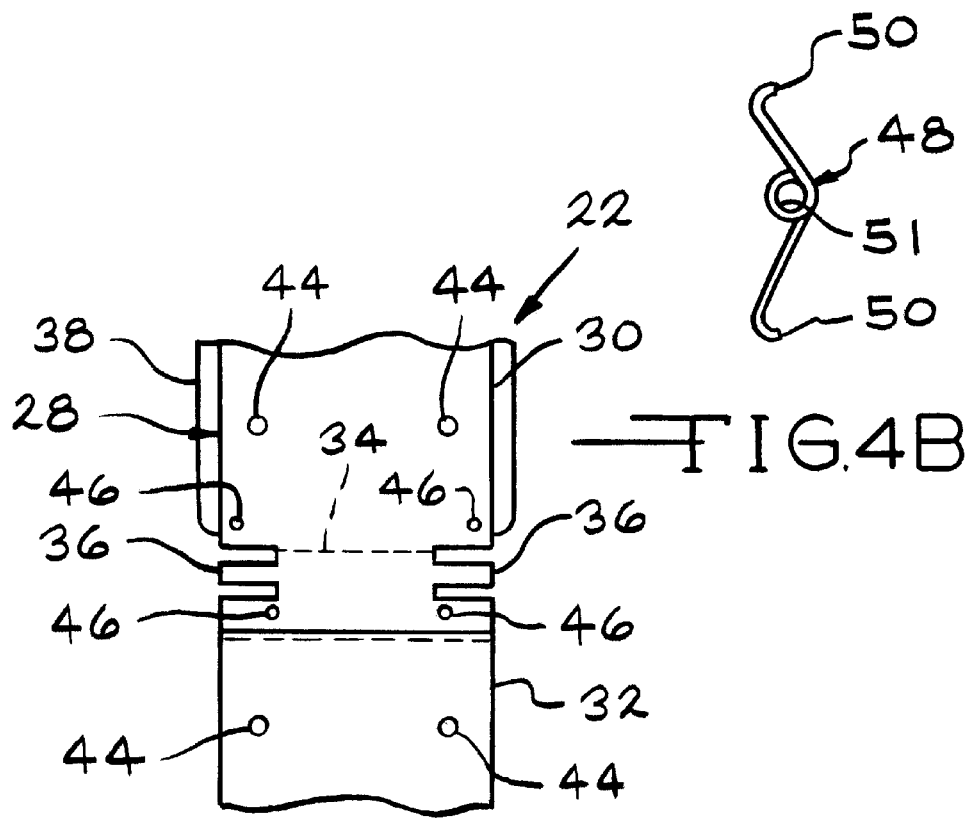
FIG. 4B
FIG. 4A

SPRING LOADED LIVING HINGE

BACKGROUND OF THE INVENTION

This invention relates generally to a spring loaded living hinge incorporated into vehicle trim.

A typical vehicle includes trim components with doors that can be opened by a user. Generally, these trim components include some form of a hinge that secures the door to the trim component and permits it to be opened. Often the hinge must be attached to both the door and the trim component. Current hinge designs are often made of metal and have been expensive. In addition, assembly time can be significant because of the need to align the hinge relative to both the trim component and the door.

It is known in the art to form a trim component and door of a plastic material and incorporate a "living hinge" between the two to permit relative movement. One disadvantage of current "living hinge" designs is that the door that is attached by the living hinge must be manually moved to pivot the door about the hinge.

Thus, it is desirable to produce a hinge having a reduced cost and assembly time that can be readily incorporated into current trim component designs. In addition, it is desirable to have a "living hinge" design that includes structure for automatically rotating the door relative to the trim component when a latch member is released.

The present invention provides a "living hinge" that is spring loaded and thus enables a door to be automatically rotated to an open position relative to the trim component once a latch is released. The spring loaded living hinge of the present invention reduces assembly time and expense of the hinge because the hinge is integral with the trim component.

SUMMARY OF THE INVENTION

In general terms, this invention provides a door attached to a trim component by a living hinge that includes a spring. A typical vehicle includes numerous trim components with doors that can be opened by a user. These doors include, for example, glove box covers, console covers, and bin lids. Often times it is desirable to provide a hinge for such a door that will open the door automatically following release of a latch. The inventive spring loaded door permits the door to rotate relative to the trim component automatically once a latch is released.

One embodiment of a trim component designed in accordance with the present invention comprises a trim component having a rigid door. At least one flexible region is located between the component and the door, with the flexible region permitting the component and the door to rotate relative to each other. At least one spring biases the door away from the component.

These and other features and advantages of this invention will become more apparent to those skilled in the art from the following detailed description of the presently preferred embodiment. The drawings that accompany the detailed description can be described as follows.

BRIEF DESCRIPTION OF THE DRAWINGS

FIG. 3 is a partial cross-sectional view of the door when a latch is at an unlatched position;

FIG. 4A is a partial front view of a first embodiment incorporating the living hinge;

FIG. 4B is a side view of one embodiment of a spring designed to be incorporated with the embodiment shown in FIG. 4A;

DETAILED DESCRIPTION OF THE PREFERRED EMBODIMENT

Figure 1:
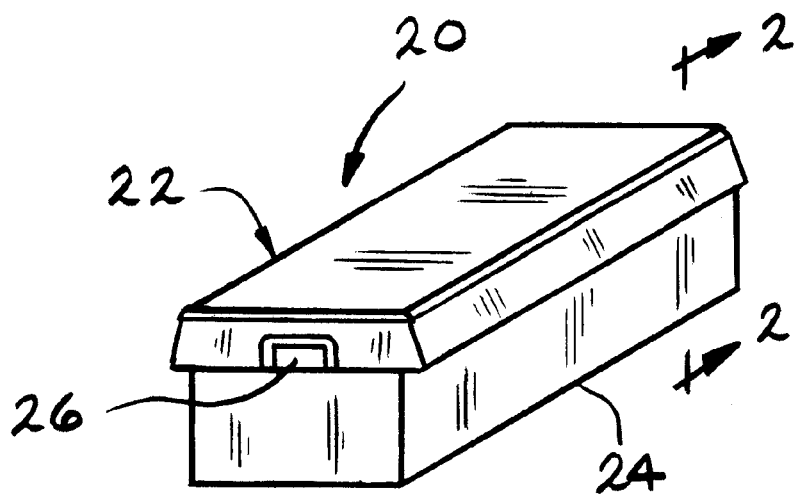
FIG. 1 is a side perspective view of a door secured to a bin using a spring loaded living hinge designed according to the present invention.

A trim component comprising a vehicle console is generally indicated at 20 in FIG. 1. While the invention is illustrated here in a console, other trim components will benefit from this invention. Vehicle console 20 includes a top door 22 that covers a bin 24. A known latch 26 is moveable between a latched position and an unlatched position. Since the latch 26 is known, details are omitted. Latch 26 secures door 22 to bin 24 when at the latched position. Door 22 rotates upwardly away from bin 24 when latch 26 is at the unlatched position, as will be described below.

Figure 2:
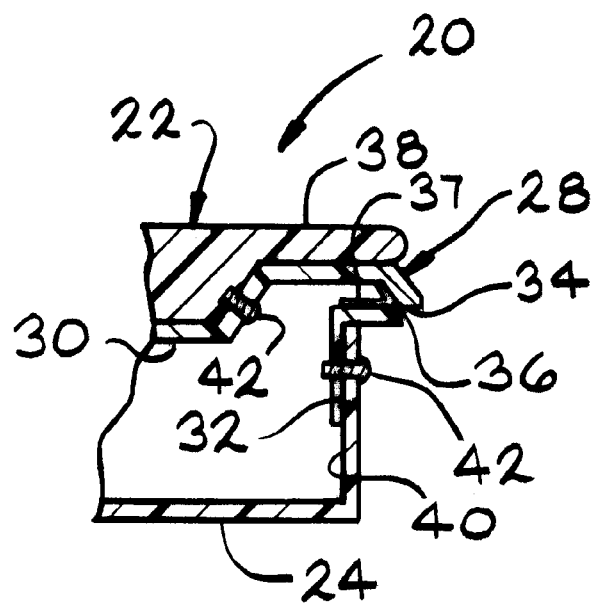
FIG. 2 is a cross-sectional view along line 2—2 of FIG. 1.

FIG. 2 is a cross-sectional view along line 2—2 of FIG. 1. Door 22 is includes a rigid panel 28. Rigid panel 28 includes a first portion 30 and a second portion 32. A flexible region 34 is located between first portion 30 and second portion 32. Flexible region 34 permits first portion 30 and second portion 32 to rotate relative to each other. A pivot point 36 is located adjacent flexible region 34. A spring 37 is located adjacent pivot point 36. Door 22 includes a finish surface 38. Preferably, finish surface 38 complements the interior of a vehicle (not shown) as is known in the art. Bin 24 includes a trim panel 40. A plurality of fasteners 42 secure first portion 30 to door 22 and second portion 32 to trim panel 40 of bin 24.

In FIG. 2, vehicle console 20 is shown with latch 26 at the latched position. Preferably, door 22 is formed from a plastic material, such as, for example, a thermoplastic. Flexible region 34 is preferably a "living hinge". The method of forming a living hinge is well known in the art and forms no portion of the present invention, thus only one formation method will be briefly described. Preferably, rigid panel 28 is formed as an integral unit having first portion 30, second portion 32, and pivot point 36. Rigid panel 28 can be formed by injection molding or thermoforming, as is known in the art. While rigid panel 28 is still warm from the chosen molding process, rigid panel 28 is repeatedly bent back and forth along a line to form flexible region 34. Bending of rigid panel 28 in this manner aligns the plastic along flexible region 34 and produces a living hinge. Other methods of forming living hinges come within the scope of this invention.

FIG. 3 shows a partial cross-sectional view of door 22 and bin 24 when latch 26 is at the unlatched position. Spring 37 biases first portion 30 away from second portion 32. Thus, when latch 26 is at the latched position, spring 37 is under tension. Moving latch 26 to the unlatched position permits spring 37 to automatically rotate first portion 30 away from second portion 32 against a force of gravity. As will be understood by one having ordinary skill in the art, the distance first portion 30 rotates away from second portion 32 in response to latch 26 being at the unlatched position will be determined by the strength of spring 37. For example, the strength of spring 37 could be adjusted to permit first portion 30 to rotate a greater distance away from second portion 32 than is shown in FIG. 3.

FIG. 4A is a partial front view of a first embodiment of door 22 that incorporates a torsional spring 48, shown in FIG. 4B, for spring 37. Door 22 includes a plurality of apertures 44 for accommodating fasteners 42. A plurality of apertures 46 are located adjacent pivot point 36 on each side of both first portion 30 and second portion 32. Apertures 46 on first portion 30 are offset relative to apertures 46 on second portion 32 to accommodate the number of coils of torsional spring 48. FIG. 4B is a side view of torsional spring 48. Torsional spring 48 includes a pair of hooks 50 adjacent coil portion 51. In use, coil portion 51 is slid over pivot point 36 and hooks 50 engage apertures 46 in each of first portion 30 and second portion 32. Thus, torsional spring 48 is held on pivot point 36 by hooks 50 and apertures 46. Most preferably, door 22 incorporates two springs 37, one on each side.

Figure 5A:
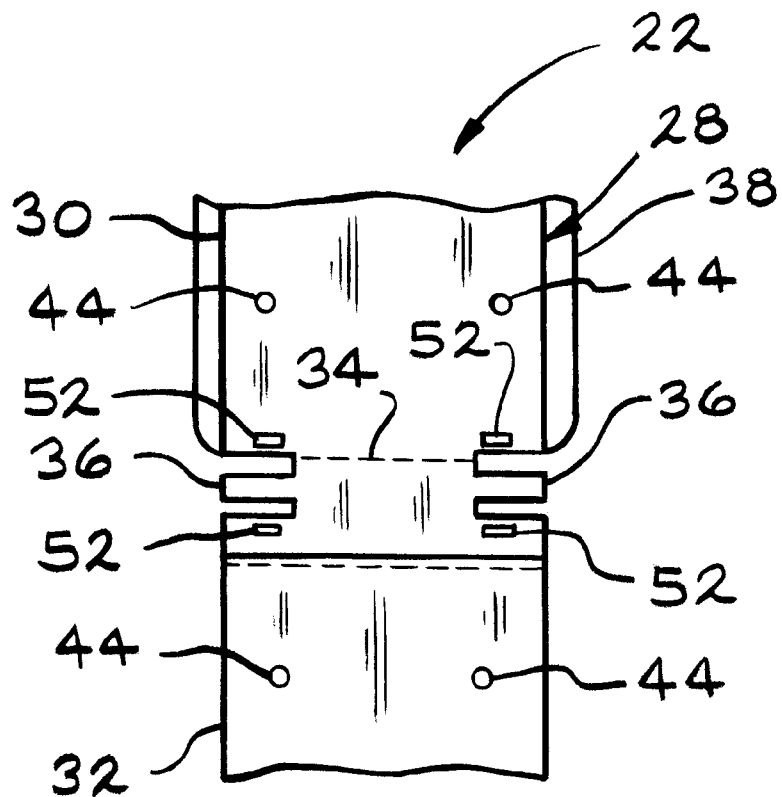
FIG. 5A is a partial front view of another embodiment incorporating the living hinge.
Figure 5B:
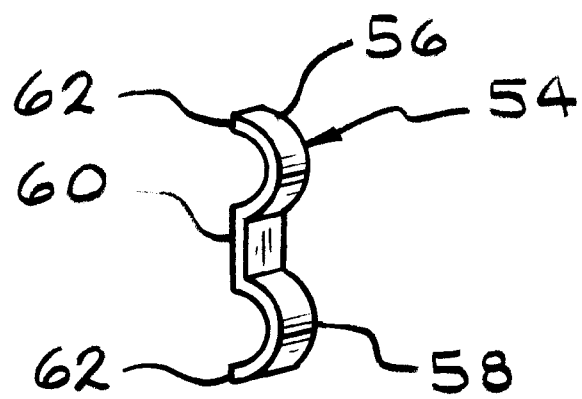
FIG. 5B is a side view of one embodiment of a spring designed to be incorporated with the hinge shown in FIG. 5A.

FIG. 5A is a partial front view of an alternative embodiment of door 22. Thus, only structures that differ from the first embodiment are designated with different numerals. In the embodiment shown in FIG. 5A apertures 46 are replaced with slots 52. FIG. 5B shows a strip 54 comprised of a resilient material that serves as spring 37. Preferably, strip 54 is formed of a metal. Strip 54 has a first end 56 and a second end 58, that are joined by a curved region 60. Both first end 56 and second end 58 include a hooked region 62. In use, hooked regions 62 are inserted into slots 52 and curved region 60 is curved around pivot portion 36 so that strip 54 biases first portion 30 away from second portion 32. Most preferably each side has a strip 54.

Figure 6:
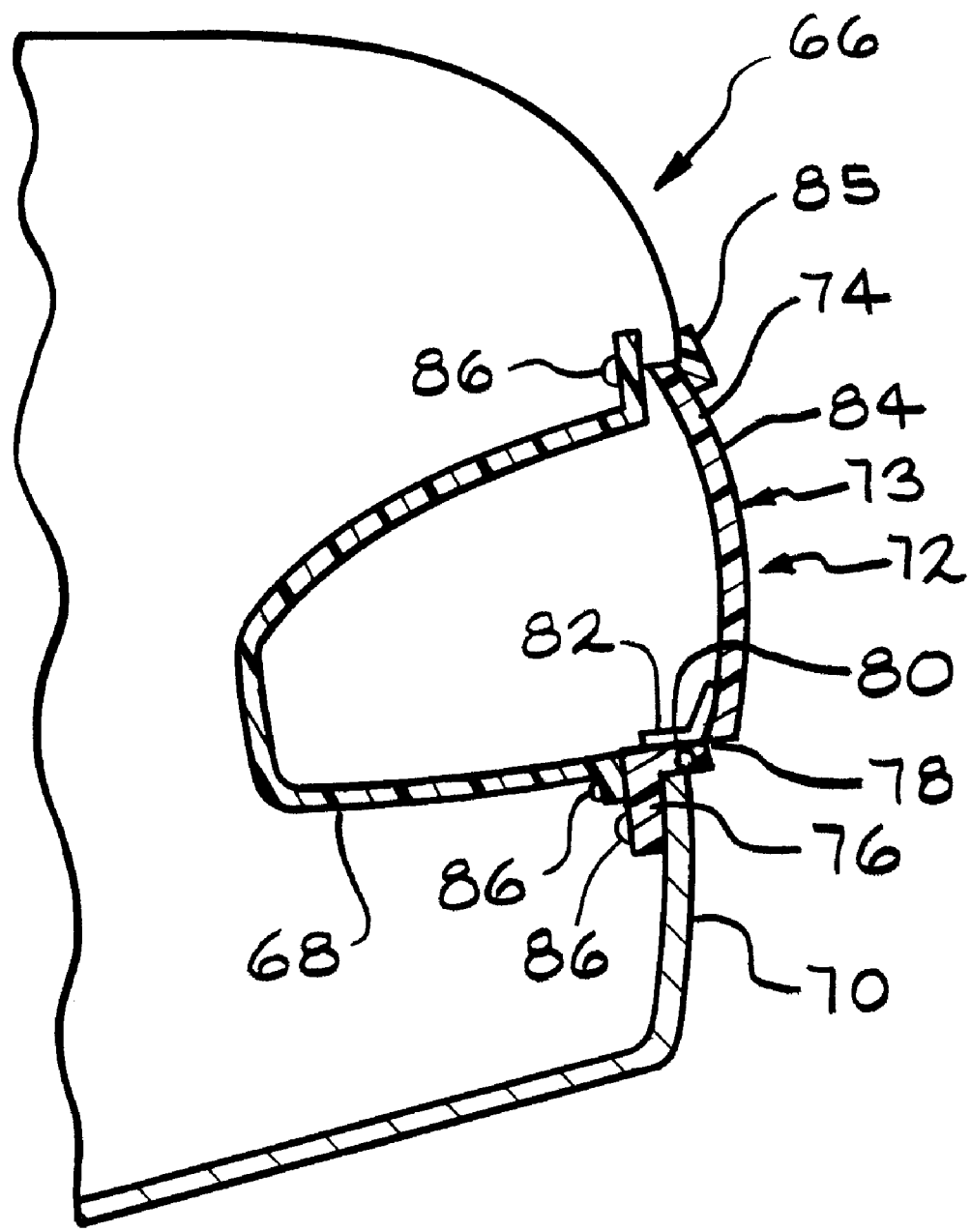
FIG. 6 is a partial cross-sectional view of an instrument panel incorporating a door having a living hinge designed according to the present invention.

In FIG. 6 a partial cross-sectional view of an instrument panel is generally shown at 66. As explained above, the trim component could be a vehicle trim panel such as an instrument panel, or other vehicle trim panels. Instrument panel 66 includes a glove box 68 and a trim panel 70. A door 72 covers an opening in a glove box 68. Door 72 includes a rigid panel 73 having a first portion 74 and a second portion 76. A flexible region 78 is located between first portion 74 and second portion 76 of rigid panel 73. A pivot point 80 is located adjacent flexible region 78. A spring 82 is located adjacent pivot point 80 and biases first portion 74 away from second portion 76. First portion 74 includes a finish surface 84. A plurality of fasteners 86 secure glove box 68 and door 72 to instrument panel 66 and trim panel 70.

Door 72 is similar to the embodiments of door 22 shown in FIGS. 4A and 5A. A latch 85 is shown schematically. FIG. 6 merely shows that a spring loaded living hinge designed in accordance with the present invention can be incorporated into a door 72 wherein the rigid panel 73 is molded to a finish surface 84. Door 72 preferably includes a pair of spaced springs, similar to the above embodiment. Likewise, spring 80 can be designed similar to torsional spring 48, strip 54, or other springs. Door 72 is preferably formed of a plastic material and flexible region 78 is preferably a living hinge. Also, the entire component, door, and living hinge can be molded as a single part in some applications. In such an application, the spring would still need to be attached.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. In combination:
    a vehicle trim component;
    a rigid door panel formed as an integral unit having a first portion and a second portion, said second portion being fastened to said trim component;
    at least one flexible region between said first and said second portion, said at least one flexible region permitting said first and said second portion to rotate relative to each other; and
    at least one spring, said at least one spring biasing said first portion away from said second portion.

2. A combination as recited in claim 1 wherein said rigid panel is formed from a plastic and said at least one flexible region comprises a living hinge.

3. A combination as recited in claim 1 wherein said at least one spring comprises a torsional spring, said torsional spring being adapted to rotate about a pivot point integral with said rigid door panel, said torsional spring having a coil portion slid over said pivot point.

4. A combination as recited in claim 3 wherein each of said first and said second portion include at least one aperture, said torsional spring including a pair of hooks, each of said hooks engaging one of said apertures.

5. A combination as recited in claim 1 wherein said at least one spring comprises a strip of a resilient material having a first end and a second end, said first and said second ends joined by a curved region, said curved region movable about a pivot point integral with said rigid door panel, said first end contacting said first portion, and said second end contacting said second portion, said strip biasing said first portion away from said second portion.

6. A combination as recited in claim 5 wherein each of said first and said second portion include at least one aperture adjacent each of said at least one pivot point, said strip including a hooked region adjacent each of said first end and said second end, each of said hooks engaging one of said apertures.

7. A combination for a vehicle as recited in claim 1 further comprising a latch, movable between a latched position and an unlatched position, said latch holding said first portion in a fixed position relative to said second portion when at said latched position, and said spring moving one of said first portion or said second portion away from the other of said first portion and said second portion when said latch is at said unlatched position.

8. A combination for a vehicle as recited in claim 1 wherein said trim component is a trim panel.

9. A combination for a vehicle as recited in claim 8 wherein said trim panel comprises an instrument panel.

10. A combination for a vehicle as recited in claim 9 wherein said door comprises a glove compartment door.

11. A combination for a vehicle as recited in claim 1 wherein said trim component comprises a bin.

12. A trim component for a vehicle comprising:
    a trim panel and a door, and a rigid panel;
    said rigid panel having a first portion and a second portion, said door attached to one of said first and said second portions, and said trim panel attached to the other of said first and said second portions;
    at least one flexible region located between said first and said second portion, said at least one flexible region permitting said first and said second portion to rotate toward each other; and at least one spring, said at least one spring biasing said first portion away from said second portion.

13. A trim component as recited in claim 12 wherein said trim panel comprises an instrument panel.

14. A trim component for a vehicle as recited in claim 13 wherein said door is a glove compartment door.

15. A trim component for a vehicle comprising:

a bin having a door and a rigid panel connecting said door to said bin;

said rigid panel having a first portion and a second portion;

at least one flexible region between said first and said second portion, said at least one flexible region permitting said first and said second portion to rotate relative to each other; and at least one spring, said at least one spring biasing said first portion away from said second portion.

16. In combination:

a vehicle trim component;

a door;

a flexible region located between said trim component and said door, said flexible region permitting said component and said door to move relative to each other;

a spring adapted to bias said door away from said trim component; and a latch holding said door relative to said trim component, wherein said spring rotates said door away from said trim component when said latch is released to automatically open said door.

17. A combination as recited in claim 16 wherein said door includes a finished surface.

18. A combination as recited in claim 16 wherein said trim component is a console bin and said door is a console door that covers said console bin.

19. A combination as recited in claim 16 wherein said trim component is an instrument panel.

20. A combination as recited in claim 19 wherein said door is a glove compartment door.

* * * * *